United States Patent
McQuillen et al.

(10) Patent No.: US 10,275,043 B2
(45) Date of Patent: Apr. 30, 2019

(54) DETECTION OF LANE CONDITIONS IN ADAPTIVE CRUISE CONTROL SYSTEMS

(71) Applicant: Ford Global Technologies, LLC, Dearborn, MI (US)

(72) Inventors: Michael McQuillen, Warren, MI (US); Daniel A. Makled, Dearborn, MI (US); Jeremy Ferack, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 15/684,904

(22) Filed: Aug. 23, 2017

(65) Prior Publication Data

US 2019/0064934 A1    Feb. 28, 2019

(51) Int. Cl.
| | |
|---|---|
| G01C 21/00 | (2006.01) |
| G06F 3/02 | (2006.01) |
| B60K 31/00 | (2006.01) |
| G08G 1/16 | (2006.01) |

(52) U.S. Cl.
CPC ........ G06F 3/0216 (2013.01); B60K 31/0008 (2013.01); G08G 1/166 (2013.01); *B60K 2031/0025* (2013.01); *B60K 2031/0033* (2013.01)

(58) Field of Classification Search
CPC .... G06F 3/0216; B60K 31/0008; G08G 1/166
See application file for complete search history.

(56) References Cited

U.S. PATENT DOCUMENTS

| | | | |
|---|---|---|---|
| 7,363,140 B2 | 4/2008 | Ewerhart et al. | |
| 9,616,888 B2 | 4/2017 | Pilutti et al. | |
| 2015/0166062 A1 | 6/2015 | Johnson et al. | |
| 2016/0257295 A1* | 9/2016 | Miller | B60W 50/0097 |
| 2016/0297435 A1* | 10/2016 | D'Amato | B60W 30/143 |
| 2017/0080931 A1* | 3/2017 | D'Amato | B60W 30/143 |
| 2017/0129501 A1 | 5/2017 | Lee | |
| 2017/0344023 A1* | 11/2017 | Laubinger | G05D 1/0272 |

FOREIGN PATENT DOCUMENTS

| | | |
|---|---|---|
| DE | 102013016242 A1 | 4/2015 |
| DE | 102014226462 A1 | 6/2016 |
| JP | 2016011031 A | 1/2016 |

* cited by examiner

*Primary Examiner* — Adam M Alharbi
(74) *Attorney, Agent, or Firm* — Frank Lollo; James P. Muraff; Neal, Gerber & Eisenberg LLP

(57) ABSTRACT

Method and apparatus are disclosed for detection of lane conditions vehicles in adaptive cruise control systems. An example vehicle includes a communication module for V2V communication, a camera for capturing images, and a controller. The controller is to identify a vehicle type of a lead vehicle based upon the images and determine a lead vehicle speed. The controller also is to send, via the communication module, an alert to the lead vehicle responsive to determining the lead vehicle is a passenger vehicle and the lead vehicle speed is less than a speed setting for activated adaptive cruise control.

18 Claims, 5 Drawing Sheets

DETECTION OF LANE CONDITIONS IN ADAPTIVE CRUISE CONTROL SYSTEMS

TECHNICAL FIELD

The present disclosure generally relates to cruise control systems and, more specifically, to detection of lane conditions in adaptive cruise control systems.

BACKGROUND

Oftentimes, vehicles include a cruise control devices, systems, and/or software that performs autonomous and/or semi-autonomous vehicle motive functions. Typically, a cruise control system enables an operator of a vehicle (e.g., a driver) to set a target speed of travel for the vehicle. Upon receiving the setting from the vehicle operator, the cruise control system autonomously controls the speed at which the vehicle travels to be the target speed. Recently, some vehicles include adaptive cruise control devices, systems, and/or software that autonomously decelerate a vehicle from the target speed upon detecting that the vehicle is approaching an object (e.g., a slower moving vehicle).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for detection of lane conditions in adaptive cruise control systems. An example disclosed vehicle includes a communication module for V2V communication, a camera for capturing images, and a controller. The controller is to identify a vehicle type of a lead vehicle based upon the images and determine a lead vehicle speed. The controller also is to send, via the communication module, an alert to the lead vehicle responsive to determining the lead vehicle is a passenger vehicle and the lead vehicle speed is less than a speed setting for activated adaptive cruise control.

An example disclosed method includes capturing, via a camera, an image and identifying, via a processor, a vehicle type of a lead vehicle based upon the image. The example disclosed method also includes determining, via the processor, a lead vehicle speed. The example disclosed method also includes sending an alert to the lead vehicle via V2V communication responsive to determining the lead vehicle is a passenger vehicle and the lead vehicle speed is less than an active speed setting for adaptive cruise control.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
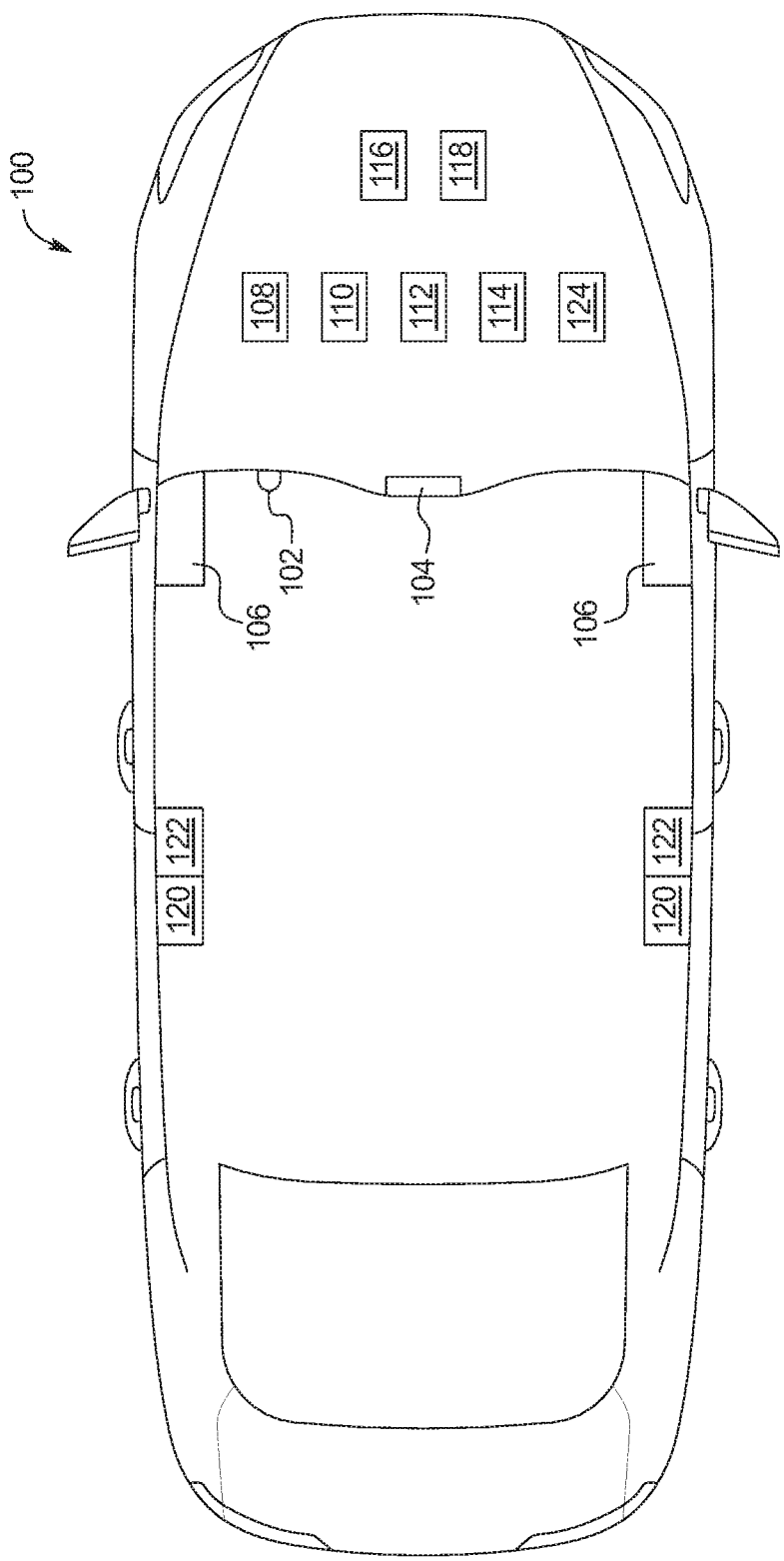
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, vehicles include a cruise control in which a vehicle autonomously controls a speed at which the vehicle travels. Typically, a cruise control system enables an operator of a vehicle (e.g., a driver) to set a target speed of travel for the vehicle. Upon receiving the setting from the vehicle operator, the vehicle autonomously controls the speed at which the vehicle travels to be the target speed. As used herein, "cruise control" refers to a device, a system, software, and/or a setting that enables a vehicle to autonomously and/or semi-autonomously travel at a target speed set by an operator of the vehicle. Recently, some vehicles include adaptive cruise control in which a vehicle autonomously decelerates from a target speed upon detecting that the vehicle is approaching an object. As used herein, refers to a device, a system, software, and/or a setting that enables a vehicle to autonomously and/or semi-autonomously travel at a target speed set by an operator of the vehicle and enables the vehicle to autonomously and/or semi-autonomously decelerate upon detecting that the vehicle is approaching another object (e.g., a slower moving vehicle). In some instances during which adaptive cruise control is activated, the vehicle approaches a vehicle that is consistently traveling at a speed below the target speed of the vehicle.

Example methods and apparatus disclosed herein facilitate a vehicle for which adaptive cruise control is activated to detect and pass a slow-moving lead vehicle. Examples disclosed herein include a vehicle that includes adaptive cruise control. While the adaptive cruise control is activated, a controller of the vehicle detects (e.g., via a camera recognition system, an electronic mapping system) whether it is traveling behind a lead vehicle that is slower than a target speed setting of the adaptive cruise control. If the lead vehicle is traveling below the target speed setting (e.g., continuously for a predetermined period of time), the controller determines (e.g., via a camera, V2V communication, V2X communication, etc.) a vehicle type or classification of the lead vehicle. If the lead vehicle is not a semi-truck, an emergency vehicle (e.g., a police vehicle, a fire truck), etc. and/or other vehicle that is required to travel at a slower speed, the controller sends an alert to the lead vehicle (e.g., via V2V communication) indicating that it is traveling slowly.

Additionally or alternatively, if the lead vehicle is traveling below the target speed setting, the controller determines a travel speed of traffic within an adjacent lane (e.g., via a camera, a sensor, V2V communication, V2X communication, a navigation system, etc.). If the travel speed within the adjacent lane is greater than that of the vehicle, the controller determines (e.g., via a camera, a proximity sensor, V2V communication, V2X communication, a navigation system, etc.) whether the lead vehicle is merging, exiting, in a no-passing zone, in a residential area and/or in any other non-passing condition. If the vehicle is in a passing condition of the road (e.g., the lead vehicle is traveling along a highway and/or expressway and is not merging, exiting, in a no-passing zone, etc.), the controller sends a signal to change lanes into the adjacent lane. For example, the signal sent by the controller causes a display to present an instruction to the driver to change lanes into the adjacent lane and/or causes a electronic control unit of the vehicle autonomously change lanes into the adjacent lane.

As used herein, "passing condition" refers to a road condition for at least a portion of a road for which a vehicle is permitted to pass a vehicle in an adjacent lane (e.g., while traveling on a highway and/or expressway). As used herein, "non-passing condition" refers to a road condition for at least a portion of a road for which a vehicle is not permitted to pass a vehicle in an adjacent lane. Example non-passing conditions include no-pass zones, merging lanes (e.g., on-ramps), diverging lanes (e.g., off-ramps), construction zones, residential areas, etc.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes a cluster output 102, a display 104, and speakers 106. For example, the cluster output 102 presents an indicator (e.g., a low tire pressure indicator, a check engine indicator, a change lanes indicator, etc.) to provide instructions and/or other information to a driver of the vehicle 100. The display 104 (e.g., a touchscreen) presents visual signals to occupant(s) of the vehicle 100 for informative and/or entertainment purposes, and the speakers 106 presents audio signals to occupant(s) of the vehicle 100 for informative and/or entertainment purposes.

As illustrated in FIG. 1, the vehicle also includes a global positioning system (GPS) receiver 108, a vehicle speed sensor 110, a communication module 112 (e.g., a first communication module) and a communication module 114 (e.g., a second communication module). The GPS receiver 108 receives a signal from a global positioning system to identify a location of the vehicle 100. Further, the vehicle speed sensor 110 detects a speed at which the vehicle 100 is travelling.

The communication module 112 is a dedicated short-range communication (DSRC) module that includes antenna(s), radio(s) and software to broadcast messages and to establish connections between the vehicle 100 and other vehicle(s) (e.g., a lead vehicle 206 of FIG. 2, a vehicle 208 of FIG. 2), infrastructure-based modules, and mobile device-based modules. For example, the communication module 112 is configured to communicate with other vehicles via vehicle-to-vehicle (V2V) communication and/or to communicate with infrastructure-based modules via vehicle-to-infrastructure (V2X) communication.

More information on the DSRC network and how the network may communicate with vehicle hardware and software is available in the U.S. Department of Transportation's Core June 2011 System Requirements Specification (SyRS) report (available at http://www.its.dot.gov/meetings/pdf/CoreSystem_SE_SyRS_RevA %20(2011-06-13).pdf), which is hereby incorporated by reference in its entirety along with all of the documents referenced on pages 11 to 14 of the SyRS report. DSRC systems may be installed on vehicles and along roadsides on infrastructure. DSRC systems incorporating infrastructure information is known as a "roadside" system. DSRC may be combined with other technologies, such as Global Position System (GPS), Visual Light Communications (VLC), Cellular Communications, and short range radar, facilitating the vehicles communicating their position, speed, heading, relative position to other objects and to exchange information with other vehicles or external computer systems. DSRC systems can be integrated with other systems such as mobile phones.

Currently, the DSRC network is identified under the DSRC abbreviation or name. However, other names are sometimes used, usually related to a Connected Vehicle program or the like. Most of these systems are either pure DSRC or a variation of the IEEE 802.11 wireless standard. However, besides the pure DSRC system it is also meant to cover dedicated wireless communication systems between cars and roadside infrastructure system, which are integrated with GPS and are based on an IEEE 802.11 protocol for wireless local area networks (such as, 802.11p, etc.).

The communication module 114 of the illustrated example includes wired or wireless network interfaces to enable communication with external networks. The communication module 114 also includes hardware (e.g., processors, memory, storage, antenna, etc.) and software to control the wired or wireless network interfaces. In the illustrated example, the communication module 114 includes one or more communication controllers for cellular networks (e.g., Global System for Mobile Communications (GSM), Universal Mobile Telecommunications System (UMTS), Long Term Evolution (LTE), Code Division Multiple Access (CDMA)) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), etc.). In some examples, the communication module 114 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

As illustrated in FIG. 1, the vehicle 100 also includes a camera 116 (e.g., a front camera, first camera), a proximity sensor 118 (e.g., a front proximity sensor, a first proximity sensor), one or more cameras 120 (e.g., side cameras, second cameras), and one or more proximity sensors 122 (e.g., side proximity sensors, second proximity sensors). The camera 116 captures image(s) and/or video of a surrounding area in front of the vehicle 100, and the cameras 120 capture image(s) and/or video of a surrounding area to the side of the vehicle 100. For example, the image(s) and/or video captured by the camera 116 and/or one or more of the cameras 120 are presented to occupant(s) of the vehicle 100 (e.g., via the display 104) and/or are utilized to facilitate performance of autonomous and/or semi-autonomous driving maneuvers of the vehicle 100. Further, the proximity sensor 118 monitors the surrounding area in front of the vehicle 100, and the proximity sensors 122 monitor the surrounding areas to the side of the vehicle 100. The proximity sensor 118 and the proximity sensors 122 collect data that detects and identifies location(s) of object(s) near the vehicle 100. The proximity sensor 118 and/or one or more of the proximity sensors 122 include a radar sensor, a lidar sensor, an ultrasonic sensor, and/or any other proximity sensor that detects the presence and location of nearby objects. For example, a radar sensor detects and locates an object via radio waves, a lidar sensor detects and locates the object via lasers, and an ultrasonic sensor detects and locates the object via ultrasound waves.

The vehicle 100 of the illustrated example also includes a lane condition controller 124. The lane condition controller 124 monitors conditions lanes (e.g., a lane 202 of FIG. 2, a lane 204 of FIG. 2) of a road (e.g., a road 200 of FIG. 2) along which the vehicle 100 is travelling while adaptive cruise control of the vehicle 100 is activated. For example, one or more electronic control units (ECU) of the vehicle 100 perform the autonomous and/or semi-autonomous motive functions of the adaptive cruise control of the vehicle 100. While the adaptive cruise control is activated, the lane condition controller 124 determines whether the vehicle 100 is traveling behind a lead vehicle (e.g., a lead vehicle 206 of FIG. 2) that is slower than a speed setting of the activated adaptive cruise control. If the lead vehicle is traveling below the speed setting (e.g., continuously for a predetermined period of time), the lane condition controller 124 sends an alert to the lead vehicle (e.g., via V2V communication) if the lead vehicle is a passenger vehicle (i.e., a vehicle that is not a semi-truck, an emergency vehicle, and/or other vehicle required to travel at a slower speed than the vehicle 100). Additionally or alternatively, if the lead vehicle is traveling below the target speed setting, the lane condition controller 124 determines whether the vehicle 100 is able to change lanes to pass the slow lead vehicle. If the vehicle 100 is able to change lanes, the lane condition controller 124 sends a signal to change lanes into the adjacent lane. For example, the signal sent by the lane condition controller 124 causes an instruction to change lanes be presented (e.g., via the cluster output 102, the display 104, the speakers 106, etc.) to the operator of the vehicle 100 and/or causes an ECU (e.g., an autonomy unit 418 of FIG. 4, a speed control unit 420 of FIG. 4, a brake control module 422 of FIG. 4) to autonomously steer the vehicle 100 into the adjacent lane.

Figure 2:
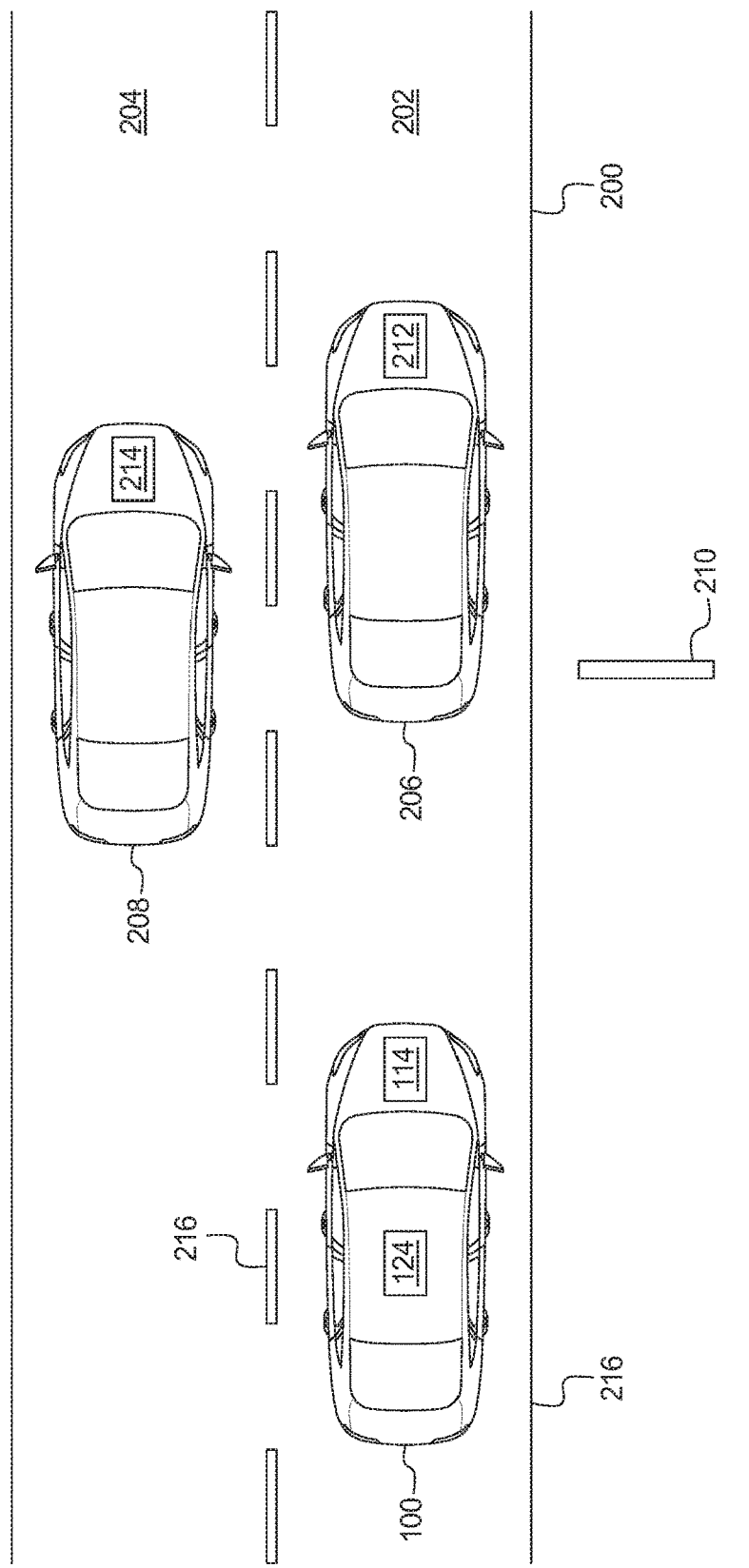
FIG. 2 illustrates the vehicle of FIG. 1 approaching a slow lead vehicle in a passing condition.

FIG. 2 illustrates the vehicle 100 traveling along a road 200 in a lane 202. As illustrated in FIG. 2, the road 200 includes the lane 202 and another lane 204 adjacent to the lane 202 that are each for vehicles traveling in a same direction. The vehicle 100 is traveling within the lane 202 behind a lead vehicle 206 in a passing condition. Further, other vehicle 208 is traveling in the lane 204 adjacent to the vehicle 100.

In the illustrated example, the adaptive cruise control of the vehicle 100 is activated. While the adaptive cruise control is activated, the lane condition controller 124 of the vehicle 100 identifies whether the vehicle 100 is traveling behind a lead vehicle. For example, the lane condition controller 124 detects that the vehicle 100 is traveling behind the lead vehicle 206 in FIG. 2. Upon identifying the presence of the lead vehicle 206, the lane condition controller 124 of the vehicle 100 determines whether the lead vehicle 206 is traveling at a lead vehicle speed that is less and/or slower than a speed setting of the adaptive cruise control of the vehicle 100.

The speed setting of the vehicle 100 is a maximum speed at which the adaptive cruise control is set to cause the vehicle 100 to travel. The speed setting of the adaptive cruise control is set by the operator of the vehicle 100 before the adaptive cruise control is activated. In some examples, ECU(s) that perform the adaptive cruise control (e.g., an autonomy unit 418 of FIG. 4, a speed control unit 420 of FIG. 4, a brake control module 422 of FIG. 4) limit the speed setting to a speed less that is less than or equal to a present speed limit of the road 200 for the vehicle 100. For example, the lane condition controller 124 and/or the ECU(s) of the vehicle 100 determine the present speed limit of the road 200 for the vehicle 100 based upon a roadside sign 210 of the road 200 that is included in image(s) and/or video captured by the camera 116 and/or one or more of the cameras 120 of the vehicle 100. For example, the vehicle 100 includes an image recognition system and/or software that enables the lane condition controller 124 and/or the ECU(s) to determine the speed limit identified on the roadside sign 210. Additionally or alternatively, the lane condition controller 124 and/or the ECU(s) determine the present speed limit of the road 200 via a navigation system. For example, the vehicle 100 includes an on-board navigation system and/or communicates with the navigation system via the communication module 114.

Further, prior to comparing the speed setting of the vehicle 100 to the lead vehicle speed of the lead vehicle 206, the lane condition controller 124 of the vehicle 100 determines the lead vehicle speed of the lead vehicle 206. For example, the lane condition controller 124 detects the lead vehicle speed of the lead vehicle 206 based upon image(s) and/or video captured by the camera 116 and/or data collected by the proximity sensor 118. That is, the proximity sensor 118 collects data that enables the lane condition controller 124 to detect the presence of and determine a speed of the lead vehicle 206. Additionally or alternatively, the lane condition controller 124 detects the lead vehicle speed of the lead vehicle 206 via V2V communication and/or V2X communication that is received by the communication module 112. For example, the communication module 112 receives the lead vehicle speed of the lead vehicle 206 from a communication module 212 (e.g., a DSRC module) of the lead vehicle 206, a communication module 214 (e.g., a DSRC module) of the vehicle 208, a communication module (e.g., a DSRC module) of an infrastructure device (e.g., the roadside sign 210), etc.

In some examples, the lane condition controller 124 compares the lead vehicle speed and the speed setting for a predetermined period of time to determine whether the lead vehicle 206 is traveling at a slower speed than the speed setting of the adaptive cruise control of the vehicle 100. That is, the lane condition controller 124 determines that the lead vehicle 206 is traveling at a slower speed than the speed setting of the adaptive cruise control of the vehicle 100 if the lane condition controller 124 determines that the lead vehicle speed is less than the speed setting of the vehicle 100 continuously for a duration of the predetermined period of time. For example, upon initially detecting that the lead vehicle speed is less than the speed setting, the lane condition controller 124 starts a timer that counts to a time threshold. If the lead vehicle speed remains less than the speed setting until the time threshold is met, the lane condition controller 124 determines that the lead vehicle 206 is traveling at a slower speed than the speed setting of the vehicle 100. The lane condition controller 124 compares the speeds for the predetermined period of time and/or during the timer to account for instances during which the lead vehicle 206 is traveling at speeds that fluctuate slightly above, slightly below, and/or at the speed setting of the vehicle 100.

The lane condition controller 124 also determines a vehicle type of the lead vehicle 206. That is, the lane condition controller 124 determines whether the lead vehicle 206 is either a passenger vehicle or a semi-truck, an emergency vehicle (e.g., a police vehicle, a fire truck, etc.), and/or another type of vehicle that is required to travel at a slower speed than the vehicle 100. For example, the lane condition controller 124 detects the vehicle type of the lead vehicle 206 based upon image(s) and/or video captured by the camera 116 and/or data collected by the proximity sensor 118. Additionally or alternatively, the lane condition controller 124 detects the lead vehicle speed of the lead vehicle 206 via V2V communication and/or V2X communication that is received by the communication module 112 (e.g., from the communication module 212 of the lead vehicle 206, the communication module 214 of the vehicle 208, an infrastructure-based DSRC module, etc.). In the illustrated example, the lane condition controller 124 sends an alert from the communication module 112 to the communication module 214 of the lead vehicle 206 responsive to determining that (i) the lead vehicle speed of the lead vehicle 206 is less than the speed setting of the vehicle 100 and (ii) the lead vehicle 206 is a passenger vehicle (i.e., not a semi-truck, an emergency vehicle, and/or other vehicle type required to travel at a slower speed). For example, the alert indicates to an ECU and/or operator operating the lead vehicle 206 that the lead vehicle 206 is traveling at a speed below the speed limit of the road 200. Alternatively, if the lane condition controller 124 determines that the lead vehicle 206 is a semi-truck, an emergency vehicle, and/or other vehicle type required to travel at a slower speed, the lane condition controller 124 does not send the alert to the lead vehicle 206.

In the illustrated example, upon determining that the lead vehicle speed is less than the speed setting of the vehicle 100, the lane condition controller 124 also determines a travel speed of traffic within the lane 204 adjacent to the lane 202 to identify whether the vehicle 100 is able to pass the lead vehicle 206 via the lane 204. In the illustrated example, the lane condition controller 124 determines a speed at which the vehicle 208 is traveling within the lane 204 adjacent to the vehicle 100 to determine the traffic speed of the lane 204. For example, the lane condition controller 124 determines the travel speed of the traffic within the lane 204 based upon image(s) and/or video captured via the camera 116, data collected by the proximity sensor 118, image(s) and/or video captured via one or more of the cameras 120, data collected by one or more of the proximity sensors 122, etc. Additionally or alternatively, the lane condition controller 124 determines the traffic speed of the traffic within the lane 204 adjacent to the vehicle 100 via V2V communication and/or V2X communication that is received by the communication module 112 of the vehicle 100 (e.g., from the communication module 212 of the lead vehicle 206, the communication module 214 of the vehicle 208, an infrastructure-based DSRC module, etc.). Further, in some examples, the lane condition controller 124 collects the traffic speed of the traffic within the lane 204 from a navigation system (e.g., an on-board navigation system, an external navigation system). Upon determining the traffic speed of the lane 204, the lane condition controller 124 compares the traffic speed of the lane 204 to the lead vehicle speed of the lead vehicle 206 to determine whether the traffic speed of the lane 204 will enable the vehicle 100 to pass the lead vehicle 206.

Further, upon determining that the lead vehicle speed is less than the speed setting of the vehicle 100, the lane condition controller 124 of the illustrated example also identifies a lane type of the lane 202 (the present lane of travel) and/or the lane 204 (e.g., the adjacent lane) of the road 200. In the illustrated example, the lane condition controller 124 determines the lane type of the lane 202 and/or the lane 204 of the road 200 based upon image(s) and/or video captured via the camera 116, data collected by the proximity sensor 118, image(s) and/or video captured via one or more of the cameras 120, data collected by one or more of the proximity sensors 122, etc. For example, the camera 116, one or more of the proximity sensor 118, one or more of the cameras 120, and/or one or more of the proximity sensors 122 are configured to detect information included on the roadside sign 210, lane markings 216 of the road 200, and/or light indicators (e.g., turn signals) of the lead vehicle 206 and/or the vehicle 100 that indicate the lane type. Additionally or alternatively, the lane condition controller 124 determines the lane type of the lane 202 and/or the lane 204 via V2V communication and/or V2X communication that is received by the communication module 112 of the vehicle 100 (e.g., from the communication module 212 of the lead vehicle 206, the communication module 214 of the vehicle 208, an infrastructure-based DSRC module, etc.). Further, in some examples, the lane condition controller 124 the lane type of the lane 202 and/or the lane 204 from a navigation system (e.g., an on-board navigation system, an external navigation system).

Upon identifying the lane type of the lane 202 and/or the lane 204, the lane condition controller 124 determines whether the lane type corresponds to a passing condition or a non-passing condition. Example lane types that correspond to non-passing conditions include residential lanes, no-passing zones, merging lanes (e.g., on-ramps), diverging lanes (e.g., off-ramps), etc. In some examples, the lane condition controller 124 deactivates upon determining that the vehicle 100 is in a residential area and activates upon determining that the vehicle 100 is on a highway and/or expressway. In the illustrated example, the lane condition controller 124 determines that the lane types of the portion of the road 200 along which the vehicle 100 is traveling corresponds to a passing condition (e.g., on a highway and/or expressway). For example, the lane condition controller 124 determines that the lane types correspond to a passing condition based upon the lane markings 216 of the road 200, a detected turn signal status of the lead vehicle 206 and/or the vehicle 208, the roadside sign 210, a navigation system, V2V communication, V2X communication, etc.

Further, the lane condition controller 124 of the illustrated example sends a signal to change lanes into the lane 204 to pass the lead vehicle 206 in response to determining that (i) the traffic speed of the lane 204 is greater than the lead vehicle speed of the lead vehicle 206 and (ii) the lane type(s) of the lane 202 and the lane 204 of the road 200 correspond to a passing condition. For example, the cluster output 102, the display 104, the speakers 106, and/or other output device present an instruction to the operator of the vehicle 100 to change lanes into the lane 204 to pass the lead vehicle 206 upon receiving the signal sent by the lane condition controller 124. Additionally or alternatively, the ECU(s) performing the adaptive cruise control to autonomously steer the vehicle 100 into the lane 204 to pass the lead vehicle 206 upon receiving the signal sent by the lane condition controller 124.

In some examples, the lane condition controller 124 also monitors a distance traveled while the lead vehicle speed of the lead vehicle 206 is less than the speed setting of the vehicle 100, for example, to account for when the vehicle 100 is at a stoplight and/or surrounded by congested traffic. For example, if the vehicle 100 has traveled a short distance (e.g., less than 1 meter) for a predetermined amount of time while the lead vehicle speed is less than the speed setting, the lane condition controller 124 determines that the vehicle 100 is at a stoplight and/or in congested traffic. In turn, the lane condition controller 124 does not send an alert to the lead vehicle 206 and/or send a signal for passing the lead vehicle 206. If the vehicle 100 has traveled a greater distance (e.g., hundreds or thousands of meters) for the predetermined amount of time while the lead vehicle speed is less than the speed setting, the lane condition controller 124 determines that the vehicle 100 is traveling on a highway and/or expressway. In turn, the lane condition controller 124 sends an alert to the lead vehicle 206 and/or sends a signal for passing the lead vehicle 206 upon determining that the lead vehicle speed is less than the speed setting.

Figure 3:
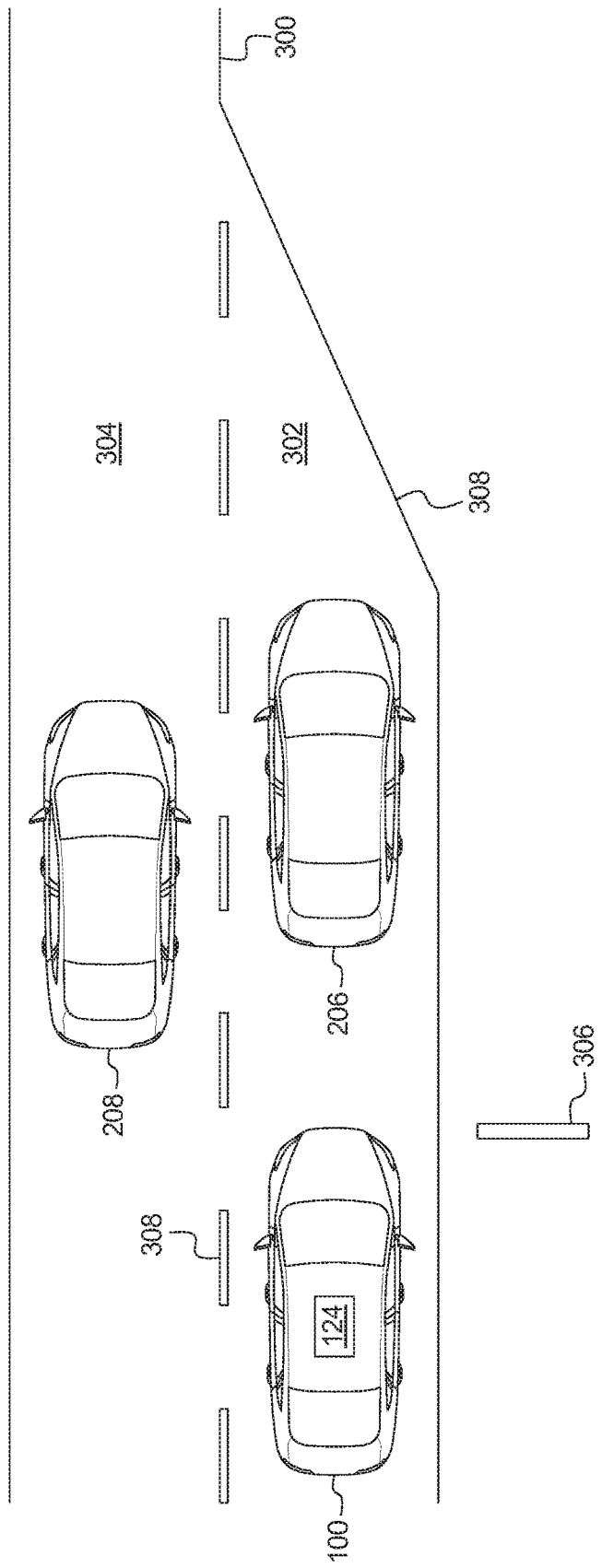
FIG. 3 illustrates the vehicle of FIG. 1 approaching a slow lead vehicle in a non-passing condition.

FIG. 3 illustrates the vehicle 100 approaching the lead vehicle 206 in a non-passing condition. As illustrated in FIG. 3, the road 300 includes a lane 302 and another lane 304 adjacent to the lane 302 that are each for vehicles traveling in a same direction. In the illustrated example, the vehicle 100 is traveling being the lead vehicle 206 within the lane 302, and the vehicle 208 is traveling in the lane 304 adjacent to the vehicle 100.

In the illustrated example, the adaptive cruise control of the vehicle 100 is activated. While the adaptive cruise control is activated, the lane condition controller 124 of the vehicle 100 identifies that the vehicle 100 is traveling behind the lead vehicle 206. For example, the lane condition controller 124 detects that the vehicle 100 is traveling behind the lead vehicle 206 in FIG. 2. Upon identifying the presence of the lead vehicle 206, the lane condition controller 124 of the vehicle 100 determines whether the lead vehicle speed of the lead vehicle 206 is less and/or slower than the speed setting of the adaptive cruise control of the vehicle 100.

The lane condition controller 124 also determines the vehicle type of the lead vehicle 206. In the illustrated example, the lane condition controller 124 sends an alert from the communication module 112 to the communication module 214 of the lead vehicle 206 responsive to determining that (i) the lead vehicle speed of the lead vehicle 206 is less than the speed setting of the vehicle 100 and (ii) the lead vehicle 206 is a passenger vehicle (e.g., not a semi-truck, an emergency vehicle, and/or other vehicle type required to travel at a slower speed). Alternatively, if the lane condition controller 124 determines that the lead vehicle 206 is a semi-truck, an emergency vehicle, and/or other vehicle type required to travel at a slower speed, the lane condition controller 124 does not send the alert to the lead vehicle 206.

Upon determining that the lead vehicle speed is less than the speed setting of the vehicle 100, the lane condition controller 124 of the illustrated example also identifies a lane type of the lane 302 (the present lane of travel) and/or the lane 304 (e.g., the adjacent lane) of the road 300. In the illustrated example, the lane condition controller 124 determines the lane type of the lane 302 and/or the lane 304 of the road 300 based upon image(s) and/or video captured via the camera 116, data collected by the proximity sensor 118, image(s) and/or video captured via one or more of the cameras 120, data collected by one or more of the proximity sensors 122, etc. That is, the camera 116, one or more of the proximity sensor 118, one or more of the cameras 120, and/or one or more of the proximity sensors 122 are configured to detect information included on a roadside sign 306, lane markings 308 of the road 300, and/or light indicators (e.g., turn signals) of the lead vehicle 206 and/or the vehicle 100 that indicate the lane type. For example, the lane condition controller 124 detects that the lane 302 is merging into the lane 304 upon collecting information included on the roadside sign 306, identifying the lane markings 308 of the road 300, and/or detecting that the left turn signal of the lead vehicle 206 is activated. Additionally or alternatively, the lane condition controller 124 determines the lane type of the lane 302 and/or the lane 304 via V2V communication and/or V2X communication that is received by the communication module 112 of the vehicle 100 (e.g., from the communication module 212 of the lead vehicle 206, the communication module 214 of the vehicle 208, an infrastructure-based DSRC module, etc.). Further, in some examples, the lane condition controller 124 collects the lane type of the lane 202 and/or the lane 204 from a navigation system.

In the illustrated example, the lane condition controller 124 determines that the lane type corresponds to a non-passing condition. That is, upon identifying that the lane type of the lane 302 is a merging lane (e.g., of an on-ramp), the lane condition controller 124 determines that the lane type corresponds to a non-passing condition. Other example, lane types corresponding to non-passing conditions include residential areas, no-passing zones, diverging lanes (e.g., of off-ramps), etc. In response to determining that the lane type in which the vehicle 100 is traveling corresponds to a non-passing condition, the lane condition controller 124 of the illustrated example does not send a signal to pass the lead vehicle 206 by changing lanes.

Figure 4:
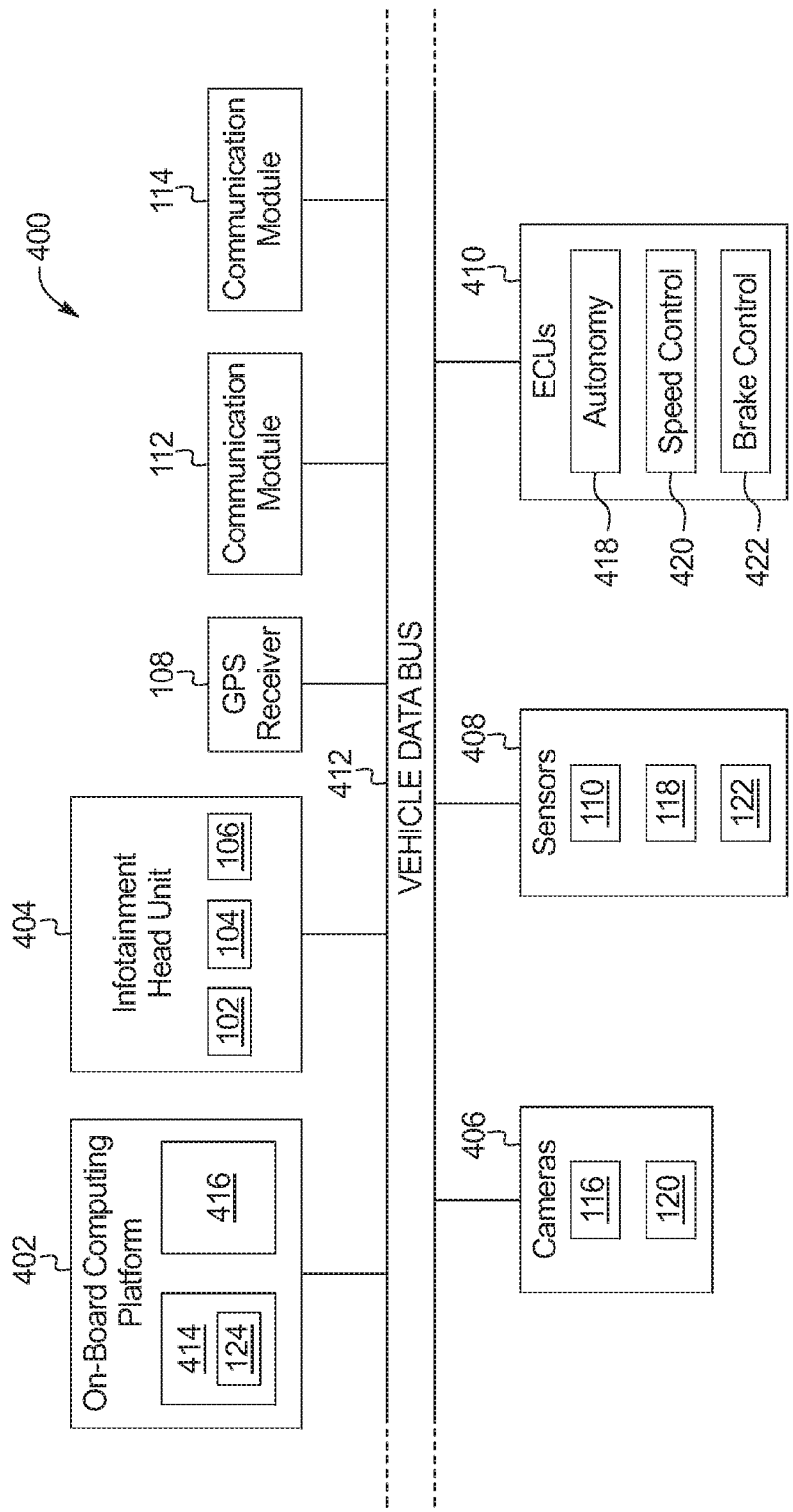
FIG. 4 is a block diagram of electronic components of the vehicle of FIG. 1.

FIG. 4 is a block diagram of electronic components 400 of the vehicle 100. As illustrated in FIG. 4, the electronic components 400 include an on-board computing platform 402, an infotainment head unit 404, the GPS receiver 108, the communication module 112, the communication module 114, cameras 406, sensors 408, electronic control units (ECUs) 410, and a vehicle data bus 412.

The on-board computing platform 402 includes a microcontroller unit, controller or processor 414 and memory 416. In some examples, the processor 414 of the on-board computing platform 402 is structured to include the lane condition controller 124. Alternatively, in some examples, the lane condition controller 124 is incorporated into another electronic control unit (ECU) (e.g., an autonomy unit, a speed control unit, a brake control module) with its own processor 414 and memory 416. The processor 414 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 416 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 416 includes multiple kinds of memory, particularly volatile memory and non-volatile memory.

The memory 416 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 416, the computer readable medium, and/or within the processor 414 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 404 provides an interface between the vehicle 100 and a user. The infotainment head unit 404 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include the cluster output 102, other instrument cluster output(s) (e.g., dials, lighting devices), actuators, a heads-up display, the display 104 e.g., (a center console display such as a liquid crystal display (LCD), an organic light emitting diode (OLED) display, a flat panel display, a solid state display, etc.), and/or the speakers 106. In the illustrated example, the infotainment head unit 404 includes hardware (e.g., a processor or controller, memory, storage, etc.) and software (e.g., an operating system, etc.) for an infotainment system (such as SYNC® and MyFord Touch® by Ford®). Additionally, the infotainment head unit 404 displays the infotainment system on, for example, the display 104.

The cameras 406 capture image(s) and/or video of a surrounding area of the vehicle 100. For example, the cameras 406 of the illustrated example include the camera 116 and the cameras 120 that capture image(s) and/or video of the surrounding area of the vehicle 100 to enable the lane condition controller 124 to determine lane conditions of the surrounding area of the vehicle 100. Further, in some examples, the cameras 406 capture image(s) and/or video that are presented to occupant(s) of the vehicle 100 (e.g., via the display 104) and/or are utilized to facilitate performance of autonomous and/or semi-autonomous driving maneuvers of the vehicle 100.

The sensors 408 are arranged in and around the vehicle 100 to monitor properties of the vehicle 100 and/or an environment in which the vehicle 100 is located. One or more of the sensors 408 may be mounted to measure properties around an exterior of the vehicle 100. Additionally or alternatively, one or more of the sensors 408 may be mounted inside a cabin of the vehicle 100 or in a body of the vehicle 100 (e.g., an engine compartment, wheel wells, etc.) to measure properties in an interior of the vehicle 100. For example, the sensors 408 include accelerometers, odometers, tachometers, pitch and yaw sensors, wheel speed sensors, microphones, tire pressure sensors, biometric sensors and/or sensors of any other suitable type. In the illustrated example, the sensors 408 include the vehicle speed sensor 110, the proximity sensor 118, and the proximity sensors 122.

The ECUs 410 monitor and control the subsystems of the vehicle 100. For example, the ECUs 410 are discrete sets of electronics that include their own circuit(s) (e.g., integrated circuits, microprocessors, memory, storage, etc.) and firmware, sensors, actuators, and/or mounting hardware. The ECUs 410 communicate and exchange information via a vehicle data bus (e.g., the vehicle data bus 412). Additionally, the ECUs 410 may communicate properties (e.g., status of the ECUs 410, sensor readings, control state, error and diagnostic codes, etc.) to and/or receive requests from each other. For example, the vehicle 100 may have seventy or more of the ECUs 410 that are positioned in various locations around the vehicle 100 and are communicatively coupled by the vehicle data bus 412.

In the illustrated example, the ECUs 410 include an autonomy unit 418, a speed control unit 420, and a brake control module 422. For example, the autonomy unit 418 controls performance of autonomous and/or semi-autonomous driving maneuvers of the vehicle 100 based upon, at least in part, image(s) and/or video captured by the one or more of the cameras 406 and/or data collected by one or more of the sensors 408. The speed control unit 420 autonomously controls a speed at which the vehicle 100 travels based upon, at least in part, image(s) and/or video captured by the one or more of the cameras 406 and/or data collected by one or more of the sensors 408. Further, the brake control module 422 autonomously operate(s) brakes of the vehicle 100 based upon, at least in part, image(s) and/or video captured by the one or more of the cameras 406 and/or data collected by one or more of the sensors 408.

The vehicle data bus 412 communicatively couples the GPS receiver 108, the communication module 112, the communication module 114, the on-board computing platform 402, the infotainment head unit 404, the cameras 406, the sensors 408, and the ECUs 410. In some examples, the vehicle data bus 412 includes one or more data buses. The vehicle data bus 412 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 5:
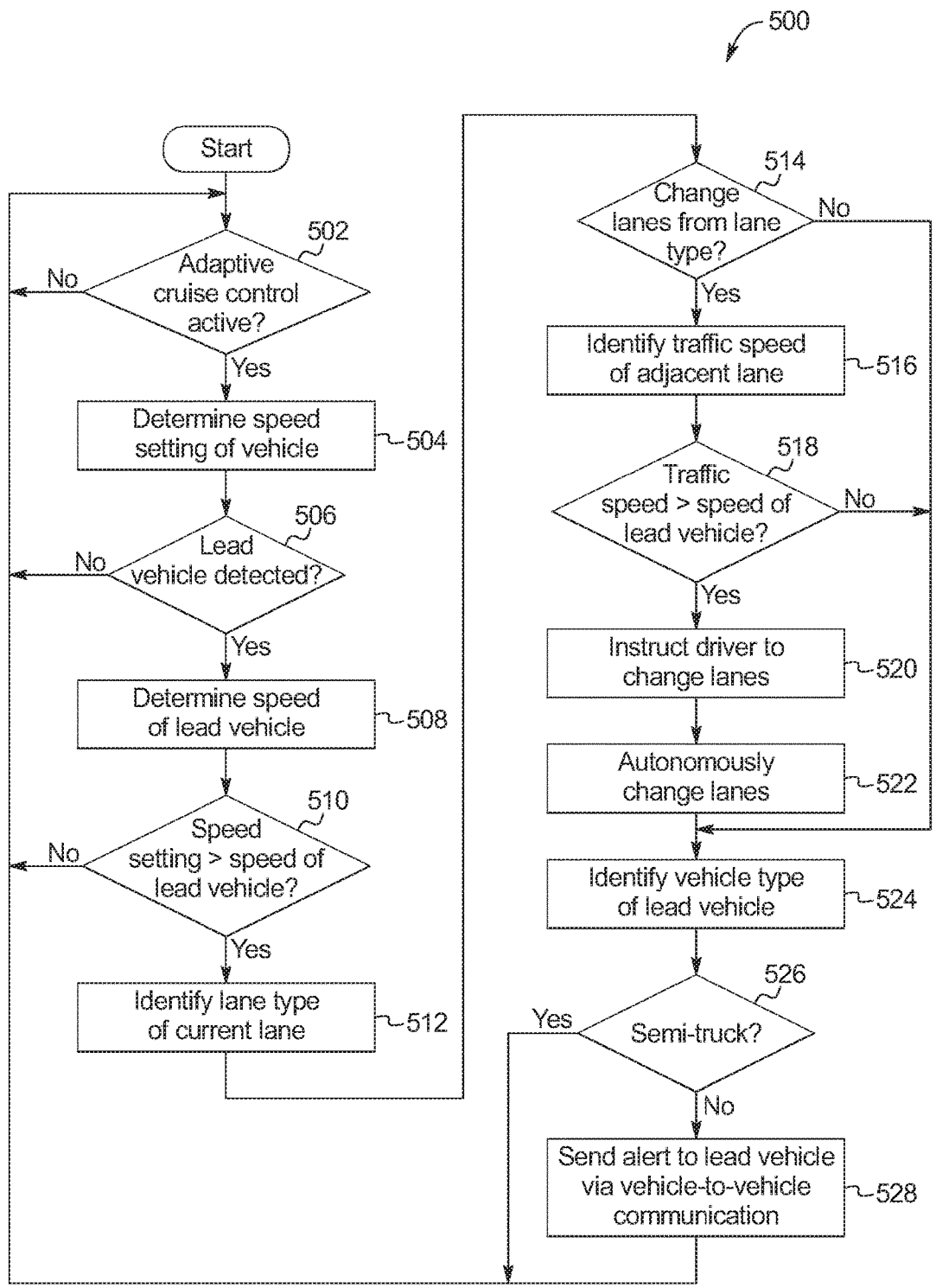
FIG. 5 is a flowchart for detecting passing conditions while adaptive cruise control is engaged in accordance with the teachings herein.

FIG. 5 is a flowchart of an example method 500 to detect lane conditions while adaptive cruise control of a vehicle is engaged. The flowchart of FIG. 5 is representative of machine readable instructions that are stored in memory (such as the memory 416 of FIG. 4) and include one or more programs which, when executed by a processor (such as the processor 414 of FIG. 4), cause the vehicle 100 to implement the example lane condition controller 124 of FIGS. 1-4. While the example program is described with reference to the flowchart illustrated in FIG. 5, many other methods of implementing the example lane condition controller 124 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the lane condition controller 124 determines whether adaptive cruise control is activated for the vehicle 100. In response to the lane condition controller 124 determining that adaptive cruise control is not activated, the method 500 remains at block 502. Otherwise, in response to the lane condition controller 124 determining that adaptive cruise control is activated, the method 500 proceeds to block 504. At block 504, the lane condition controller 124 determines a speed setting of the adaptive cruise control of the vehicle 100.

At block 506, the lane condition controller 124 determines whether a lead vehicle (e.g., the lead vehicle 206) is detected. For example, the lane condition controller 124 detects the lead vehicle 206 via the camera 116, the proximity sensor 118, V2V and/or V2X communication received by the communication module 112, etc. In response to the lane condition controller 124 not detecting the lead vehicle 206, the method 500 returns to block 502. Otherwise, in response to the lane condition controller 124 detecting the presence of the lead vehicle 206, the method 500 proceeds to block 508 at which the lane condition controller 124 determines the lead vehicle speed of the lead vehicle 206. For example, the lane condition controller 124 detects the lead vehicle speed via the camera 116, the proximity sensor 118, V2V and/or V2X communication received by the communication module 112, etc. At block 510, the lane condition controller 124 determines whether the speed setting of the adaptive cruise control of the vehicle 100 is greater than the lead vehicle speed of the lead vehicle 206. In response to the lane condition controller 124 determining that the speed setting is not greater than the lead vehicle speed, the method 500 returns to block 502. Otherwise, in response to the lane condition controller 124 determining that the speed setting is greater than the lead vehicle speed, the method 500 proceeds to block 512.

At block 512, the lane condition controller 124 identifies the lane type of the current lane of travel (e.g., the lane 202 of FIG. 2, the lane 302 of FIG. 3) and/or the adjacent lane (e.g., the lane 204 of FIG. 2, the lane 304 of FIG. 3) of the road (e.g., the road 200 of FIG. 2, the road 300 of FIG. 3). For example, the lane condition controller 124 identifies the lane type to determine whether the portion of the road at which the vehicle 100 is located is in a passing condition or a non-passing condition. Example lane types include residential lanes, passing zones, non-passing zones, merging lanes, diverging lanes, etc. The lane condition controller 124 is to identify the lane type via the camera 116, the proximity sensor 118, one or more of the cameras 120, one or more of the proximity sensors 122, V2V and/or V2X communication received by the communication module 112, a navigation system, etc. At block 514, the lane condition controller 124 determines whether the vehicle 100 is in a position to change lanes based upon the lane type. For example, the vehicle 100 is in a position to change lanes if the portion of the road at which the vehicle 100 is located is in a passing condition, and the vehicle 100 is not in a position to change lanes if the portion of the road at which the vehicle 100 is located is in a non-passing condition. In response to the lane condition controller 124 determining that the vehicle 100 is not in a position to change lanes, the method 500 proceeds to block 526. Otherwise, in response to the lane condition controller 124 determining that the vehicle 100 is in a position to change lanes, the method 500 proceeds to block 516.

At block 516, the lane condition controller 124 identifies the traffic speed of traffic within the adjacent lane. For example, the lane condition controller 124 identifies the traffic speed via the camera 116, the proximity sensor 118, one or more of the cameras 120, one or more of the proximity sensors 122, V2V and/or V2X communication received by the communication module 112, a navigation system, etc. At block 518, the lane condition controller 124 determines whether the traffic speed is greater than the lead vehicle speed of the lead vehicle 206. In response to the lane condition controller 124 determining that the traffic speed is not greater than the lead vehicle speed, the method 500 proceeds to block 526. Otherwise, in response to the lane condition controller 124 determining that the traffic speed is greater than the lead vehicle speed, the method 500 proceeds to block 520.

At block 520, the lane condition controller 124 instructs (e.g., via the cluster output 102, the display 104, the speakers 106, etc.) the driver and/or operator of the vehicle 100 to change lanes. At block 522, the lane condition controller 124 causes the ECU(s) controlling the adaptive cruise control to autonomously steer the vehicle 100 to change lanes into the adjacent vehicle to pass the lead vehicle 206. For example, the lane condition controller 124 sends a signal to cause the instructions to be presented and/or to cause the autonomous changing of lanes.

At block 524, the lane condition controller 124 identifies the vehicle type of the lead vehicle 206. For example, the lane condition controller 124 is identifies the vehicle type via the camera 116, the proximity sensor 118, V2V and/or V2X communication received by the communication module 112, etc. At block 526, the lane condition controller 124 determines whether lead vehicle 206 is a semi-truck, an emergency vehicle, and/or other type of vehicle that is required to travel at a slower speed than the speed limit for the vehicle 100. In response to the lane condition controller 124 determining that the lead vehicle 206 is a semi-truck, an emergency vehicle, and/or other vehicle type required to travel at a slower speed, the method returns to block 502. Otherwise, in response to the lane condition controller 124 determining that the lead vehicle 206 is a passenger vehicle, the method proceeds to block 528 at which the lane condition controller 124 sends an alert to the lead vehicle 206, via V2V communication, indicating that the lead vehicle 206 is driving slowly.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module" and "unit" refer to hardware with circuitry to provide communication, control and/or monitoring capabilities, often in conjunction with sensors. A "module" and an "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
a communication module for V2V communication;
a camera for capturing images;
a controller to:
identify a vehicle type of a lead vehicle based upon the images; determine a lead vehicle speed; and
send, via the communication module, an alert to the lead vehicle responsive to determining:
the lead vehicle is a passenger vehicle; and
the lead vehicle speed is less than a speed setting for activated adaptive cruise control;
wherein the controller determines that the lead vehicle speed is less than the speed setting continuously for a predetermined period of time prior to sending the alert to the lead vehicle.

2. The vehicle of claim 1, wherein the controller does not send the alert to the lead vehicle responsive to determining the lead vehicle is a semi-truck or an emergency vehicle.

3. The vehicle of claim 1, further including an ECU that performs the adaptive cruise control when the adaptive cruise control is activated, the ECU limits the speed setting to a speed less than or equal to a present speed limit.

4. The vehicle of claim 1, wherein the controller determines the lead vehicle speed of the lead vehicle based upon the images captured by the camera.

5. The vehicle of claim 1, wherein the communication module receives the lead vehicle speed for the controller.

6. The vehicle of claim 1, further including a proximity sensor for detecting the lead vehicle, wherein the controller determines the lead vehicle speed via data collected by the proximity sensor.

7. The vehicle of claim 1, wherein the controller is to:
determine a traffic speed of an adjacent lane of travel; and
compare the traffic speed to the lead vehicle speed in response to determining the lead vehicle speed is less than the speed setting.

8. The vehicle of claim 7, wherein the controller is to:
identify a lane type of a present lane of travel; and
determine whether the lane type corresponds to a passing condition in response to determining the lead vehicle speed is less than the speed setting.

9. The vehicle of claim 8, wherein the controller sends a signal for passing the lead vehicle responsive to determining:
the traffic speed is greater than the lead vehicle speed; and
the lane type of the present lane of travel corresponds to a passing condition.

10. The vehicle of claim 9, wherein a non-passing condition includes at least one of the lane type being a no-pass zone, a merging lane, a diverging lane, and a residential lane.

11. The vehicle of claim 9, further including a display that presents an indicator to change lanes into the adjacent lane upon receiving the signal from the controller.

12. The vehicle of claim 9, further including an ECU that autonomously changes lanes into the adjacent lane upon receiving the signal from the controller.

13. The vehicle of claim 8, wherein the controller determines the lane type and the traffic speed via at least one of V2V communication, V2X communication, a navigation map system, the camera, a side camera, and one or more proximity sensors.

14. The vehicle of claim 8, wherein the controller determines the lane type based upon the images captured by the camera that indicate at least one of lane markings of a road and a turn signal status of the lead vehicle.

15. A method comprising:
capturing, via a camera, an image;
identifying, via a processor, a vehicle type of a lead vehicle based upon the image;
determining, via the processor, a lead vehicle speed;
sending an alert to the lead vehicle via V2V communication responsive to determining:
the lead vehicle is a passenger vehicle; and
the lead vehicle speed is less than an active speed setting for adaptive cruise control;
identifying a lane type of a present lane of travel;
determining a traffic speed of an adjacent lane; and
sending a signal for passing the lead vehicle responsive to determining;
the traffic speed is greater than the lead vehicle speed; and
the lane type of the present lane of travel corresponds to a passing condition.

16. The method of claim 15, wherein a non-passing condition includes at least one of the lane type being a residential lane, a no-pass zone, a merging lane, and a diverging lane.

17. The method of claim 15, further including presenting, via a display, an indicator to change lanes into the adjacent lane upon receiving the signal.

18. The method of claim 15, further including autonomously changing lanes, via an ECU, into the adjacent lane upon receiving the signal.

* * * * *